US007828655B2

(12) United States Patent
Uhlir et al.

(10) Patent No.: US 7,828,655 B2
(45) Date of Patent: Nov. 9, 2010

(54) APPLICATION PROGRAMMING INTERFACE FOR GEOGRAPHIC DATA IN COMPUTER GAMES

(75) Inventors: Kurt Brooks Uhlir, Chicago, IL (US); Christopher Dougherty, Highland Park, IL (US); Michael V. Shuman, Chicago, IL (US); Roy Casino, Mundelein, IL (US)

(73) Assignee: Navteq North America, LLC, Chicago, IL (US)

( * ) Notice: Subject to any disclaimer, the term of this patent is extended or adjusted under 35 U.S.C. 154(b) by 776 days.

(21) Appl. No.: 10/798,531

(22) Filed: Mar. 11, 2004

(65) Prior Publication Data

US 2005/0202877 A1 Sep. 15, 2005

(51) Int. Cl.
G06F 17/00 (2006.01)
G06F 19/00 (2006.01)
G06G 7/00 (2006.01)
(52) U.S. Cl. .................... 463/30; 434/29; 434/62; 434/64; 434/65; 434/69; 706/7; 706/8; 702/5; 463/6; 463/31; 463/43
(58) Field of Classification Search ............ 434/29–71, 434/150; 706/7, 8; 702/5; 463/6, 31–33, 463/43, 44
See application file for complete search history.

(56) References Cited

U.S. PATENT DOCUMENTS 2,026,082 A 12/1935 Darrow .................. 273/134
4,097,051 A 6/1978 Goldberg et al.
4,645,459 A 2/1987 Graf et al. ................... 434/43
5,184,956 A 2/1993 Langlais et al. .............. 434/69
5,526,479 A 6/1996 Barstow et al. ............ 395/152
5,566,073 A * 10/1996 Margolin ................... 701/213
5,573,402 A 11/1996 Gray ........................ 434/69
5,616,079 A 4/1997 Iwase et al. .................. 463/32
5,618,043 A 4/1997 McGlew ................... 273/308

(Continued)

FOREIGN PATENT DOCUMENTS

EP 1 107 189 6/2001

(Continued)

OTHER PUBLICATIONS

Doug Radcliffe, Andy Mahood, Microsoft Flight Simulator 2004: A Century of Flight: Official Strategies & Secrets, Jul. 2003.*

(Continued)

Primary Examiner—Xuan M Thai
Assistant Examiner—Kang Hu
(74) Attorney, Agent, or Firm—Adil M. Musabji; Frank J. Kozak; Jon D. Shutter

(57) ABSTRACT

A computer game depicts or represents actual or imaginary geographic locales as part of the play scenarios of the games. The computer game uses a map database that contains data that represent geographic features, such as roads, in a locale. A game engine program presents a game play scenario to a user via a user interface of the game. An application programming interface program accepts requests for data from the game engine program, accesses data from the map database, and provides the data in a suitable format to the game engine program for use in presenting the game scenario to the user.

30 Claims, 5 Drawing Sheets

U.S. PATENT DOCUMENTS

| | | | |
|---|---|---|---|
| 5,651,676 | A | 7/1997 | Artwick ........................ 434/43 |
| 5,660,547 | A | 8/1997 | Copperman ................... 434/29 |
| 5,823,780 | A | 10/1998 | Arye et al. ..................... 434/38 |
| 6,023,278 | A * | 2/2000 | Margolin ..................... 345/419 |
| 6,047,280 | A * | 4/2000 | Ashby et al. ..................... 707/2 |
| 6,146,143 | A | 11/2000 | Huston et al. .................. 434/69 |
| 6,171,186 | B1 | 1/2001 | Kurosawa et al. ............. 463/31 |
| 6,173,277 | B1 | 1/2001 | Ashby et al. ..................... 707/1 |
| 6,183,364 | B1 | 2/2001 | Trovato ........................ 463/32 |
| 6,183,634 | B1 | 2/2001 | Du Toit et al. ................. 201/94 |
| 6,266,614 | B1 | 7/2001 | Alumbaugh ................. 701/211 |
| 6,268,858 | B1 * | 7/2001 | Nathman et al. ............ 345/419 |
| 6,289,276 | B1 | 9/2001 | Ahrens et al. ............... 701/200 |
| 6,343,301 | B1 | 1/2002 | Halt et al. |
| 6,362,817 | B1 * | 3/2002 | Powers et al. ............... 345/419 |
| 6,401,033 | B1 | 6/2002 | Paulauskas et al. ......... 701/207 |
| 6,489,963 | B2 * | 12/2002 | Parikh et al. ................ 345/522 |
| 6,509,869 | B2 | 1/2003 | Aoyama ................ 342/357.13 |
| 6,612,925 | B1 | 9/2003 | Forsberg ........................ 463/6 |
| 6,677,858 | B1 | 1/2004 | Faris et al. ............... 340/573.1 |
| 6,772,142 | B1 | 8/2004 | Kelling et al. |
| 6,961,055 | B2 * | 11/2005 | Doak et al. .................. 345/419 |
| 7,038,694 | B1 | 5/2006 | Santodomingo et al. .... 345/582 |
| 7,570,261 | B1 | 8/2009 | Edecker et al. |
| 2001/0034661 | A1 | 10/2001 | Ferreira |
| 2002/0063654 | A1 | 5/2002 | Aoyama ................ 342/357.13 |
| 2002/0091005 | A1 | 7/2002 | Shoji et al. ..................... 472/65 |
| 2002/0187831 | A1 | 12/2002 | Arikawa et al. ............... 463/32 |
| 2002/0198694 | A1 | 12/2002 | Yang et al. |
| 2003/0059743 | A1 | 3/2003 | Lechner ........................ 434/43 |
| 2003/0195023 | A1 | 10/2003 | Di Cesare ...................... 463/9 |
| 2003/0214530 | A1 | 11/2003 | Wang et al. ................. 345/757 |
| 2003/0215110 | A1 * | 11/2003 | Rhoads et al. .............. 382/100 |
| 2004/0078263 | A1 | 4/2004 | Altieri |
| 2004/0176936 | A1 * | 9/2004 | Ohtsu et al. ..................... 703/8 |
| 2004/0236543 | A1 | 11/2004 | Stephens |
| 2005/0159216 | A1 | 7/2005 | Chiu et al. .................... 463/31 |

FOREIGN PATENT DOCUMENTS

| | | |
|---|---|---|
| JP | 11-057209 | 3/1999 |
| JP | 2003-000940 | 1/2003 |
| JP | 2003-023357 | 1/2003 |
| JP | 2003-329449 | 11/2003 |
| WO | WO 02/26518 A1 | 4/2002 |
| WO | WO 02/39363 A1 | 5/2002 |

OTHER PUBLICATIONS

Quick; After Him: Pac-Man WentThataway, The New York Times, Section 9-Sunday Styles, pp. 1 and 11. (May 9, 2004).

Pac Manhattan, http://pacmanhattan.com/yourcity.php, pp. 1-3, (2004).

Map Quests, Wired, p. 052 (Feb. 2004).

*Microsoft Flight Simulator 2002 Software Development Kit*; Autogen, XP002335786, pp. 4, 6-8, http: //microsoft.com/games/flightsimulator/fs2002_downloads_sdk.asp#scenery>; Apr. 2002.

Muller, Chris; Denney, Eddie; *AVSIM Commercial Scenery Review*; Real Scene U.S. Terrain Mesh Scenery for FS2002; XP002335787, entire document; http://www.avsim.com/pages/0402/realscene_terrainmesh/rs_us_tms.html; Apr. 2002.

Klaus, Todd; Terra Scene V2.0, TerraScene Scenery Generation System—Tutorials and Reference Guide; XP002335169, pp. 1-63; http://library.avsim.net/sendfile.php?; Apr. 2004.

Cable, Tim; Klaus, Todd; *AVSIM Freeware Utility Review*, Terra Scene, XP002335170, entire document, http://avsim.com/pages/0500/terrascene/terrascene.shtml> May 2000.

*3D Nature*: "What is Visual Nature Studio" EP002335442, entire document http://web/archive.org/web/20040202220153; http: //wwww.3dnature.com/vnsinfo.html>, Feb. 2004.

Freedman, Jonah, *Map Quests*, XP002335320, 1 page, http://www.wired.com/wired/archive/12.02/play_pr.html> Feb. 2004.

3D Nature PLC, Ltd.; "Comparison of features" *World Construction Set, Visual Nature Studio*, 'Online!', XP002335684, http://web.archive.org/web/20031206133238/http://www.3dnature.com/comparingfeatures.html>, entire document (Dec. 2003).

Koller et al., "Virtual GIS: A Real-Time 3D Geographic Information System", *Proceedings of 6th IEEE Visualization Conference*, XP002335667, pp. 94-100 (Oct. 1995).

SimCity 2000 User's Manual (for Super Nintendo), 1996.

SimCopter User's Manual, 1996.

Photography of side of SimCity200 box, 1993.

SimCity 2000 User's Manual (for PC), 1993.

Game Information of True Crime: Streets of L.A., release date Aug. 1, 2003, p. 1-2, accessed online at: http://www.xbox.com/en-US/games/t/truecrimestreetsofla/ on Jan. 4, 2008.

Koller et al., "Virtual GIS: A Real-Time 3D Geographic Information System", Proceedings of the 6th IEEE Visualization Conference, IEEE: 1995, pp. 94-100.

"World Construction Set or Visual Nature Studio", http://web.archive.org/web/20031206133238/http://www.3dnature.com/comparinqfeatures.html, Jan. 4, 2008, pp. 1-6.

Freedman, Jonah, Map Quests, XP002335320, http://wired.com/wired/archive/12.02/play_pr.html, Feb. 2004, p. 1.

www.mapquest.com, 1 page: 1997. http://web.archive.org/web/19970410221743/http://www.mapquest.com/.

William Cartwright, "Metaphor and Gaming and Access to Spatial Information", paper for 4th E-Mail Seminar on Cartography 2001 "Cartographic Education", pp. 1-7 www.uacg.bg/UACEG_site/sern_geoWilliam%Cartwright.doc (2009).

Wikipedia reference. 6 pages, retrieved on Jun. 16, 2009. http://en.wikipedia.org/wiki/Streets_of_SimCity.

\* cited by examiner

● END POINT

APPLICATION PROGRAMMING INTERFACE FOR GEOGRAPHIC DATA IN COMPUTER GAMES

REFERENCE TO RELATED APPLICATIONS

The present application is related to copending patent applications entitled "METHOD AND SYSTEM FOR USING GEOGRAHIC DATA IN COMPUTER GAME DEVELOPMENT", bearing application Ser. No. 10/798,459 filed Mar. 11, 2004 "GEOGRAPHIC AREA TEMPLATES FOR COMPUTER GAMES", and "COMPUTER GAME DEVELOPMENT FACTORY SYSTEM AND METHOD", bearing application Ser. No. 10/798,703 filed Mar. 11, 2004, the entire disclosures of which are incorporated by reference herein.

BACKGROUND OF THE INVENTION

The present invention relates to a system and method that facilitate development of computer games and more particularly, a system and method that facilitate development of computer games that include representations of geographic areas, including such features as the road networks in the geographic areas. Computer games have developed in sophistication and commercial importance. Improvements in computer hardware and software have enabled computer games to provide realistic graphics and sound. With these advances, computer game users have come to expect that games meet high standards for richness and attention to detail. Some computer games, such as road race games, represent real world places as part of the playing scenarios of the games. With these types of games, users expect convincing depictions of the real world with attention to accuracy and detail.

Computer game developers have recognized the need to provide realistic depictions of actual real world places in computer games. This has placed a burden on computer game developers to obtain the data needed to portray geographic places with realistic detail and accuracy. The collection of such detailed geographic data about real world roads, places, etc., is time-consuming and expensive. Further, the collection of detailed real world data diverts the resources of computer game developers away from other important aspects of computer game creation, such as characters, story lines, and strategies. Thus, there exists a need to facilitate the collection and use of geographic data by game developers.

Another consideration related to the development of computer games that depict geographic places relates to providing a variety of different locales. Even if a computer game developer collects all the data needed to depict a particular real world locale (such as a city) with the richness and detail expected by game players, the game play scenario is limited to only that particular locale. This may limit the appeal of the computer game. Therefore, it may be advantageous for a computer game developer to provide games that depict a variety of different real world locales. However, if a computer game developer wants to provide a game with different real world locales, the developer is required to collect geographic data for each different locale, thus incurring further considerable expense.

Still another consideration related to the development of computer games that depict geographic places concerns providing games on a variety of different hardware platforms. There exist a variety of different hardware platforms on which computer games are played. These different hardware platforms have different resources, such as memory, processor speed, user interface, etc. In addition, there are multi-player games that can involve a variety of different platforms intended to work together. Developing games that utilize the available resources of different computer platforms also presents a challenge to game developers.

Accordingly, it is an objective to provide ways to make computer games that represent actual real world places.

It is another objective to facilitate the representation of actual physical real world places or imaginary places in computer games.

SUMMARY OF THE INVENTION

To address these and other objectives, the present invention includes a computer game that depicts or represents actual or imaginary geographic locales as part of the play scenarios of the games. The computer game uses a map database that contains data that represent geographic features, such as roads, in a locale. A game engine program presents a game play scenario to a user via a user interface of the game. An application programming interface program accepts requests for data from the game engine program, accesses data from the map database, and provides the data in a suitable format to the game engine program for use in presenting the game scenario to the user.

DETAILED DESCRIPTION OF THE PRESENTLY PREFERRED EMBODIMENTS

I. Source Geographic Database

The embodiments disclosed herein relate to computer games that depict real or imaginary geographic locales as part of the play scenarios of the computer games. For example, the play scenarios may involve a car chase through the streets of Miami, Fla., a treasure hunt through the countries of Europe, a flight simulator game over Texas, and so on. Game play scenarios may also involve imaginary places, such as a southern California-style city. In the embodiments disclosed herein, geographic data used in the computer games is obtained from a map data developer. In these embodiments, the map data developer collects, confirms, updates, processes and distributes geographic data for other, non-game related purposes, such as navigation-related purposes, but also provides geographic data for use in computer games.

Figure 1:
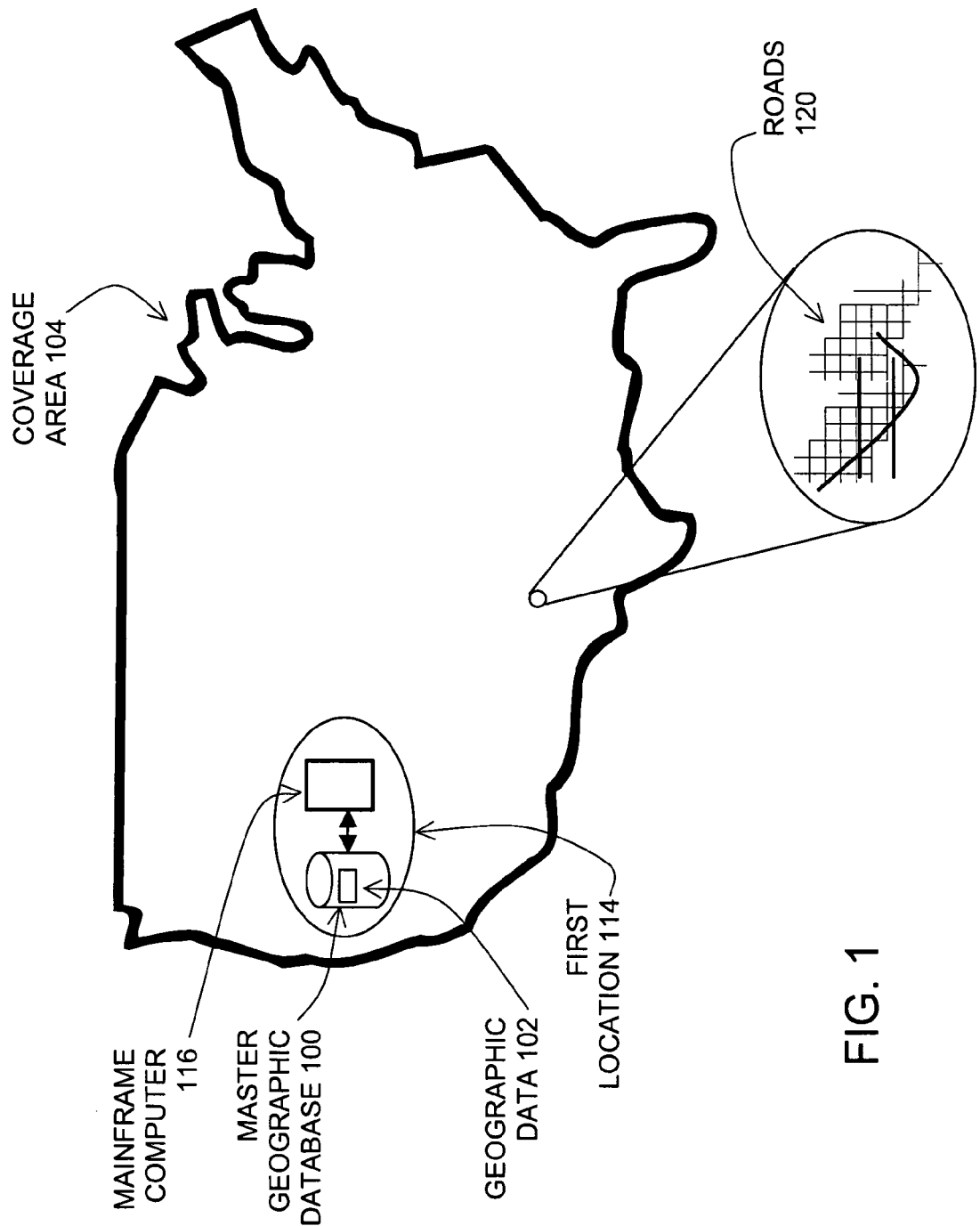
FIG. 1 is a diagram that illustrates a relationship between a master version of a geographic database and a coverage area.

FIG. 1 shows a master or source version of a geographic database 100. The master version of the geographic database is owned and developed by a geographic database developer 101 (also referred to as a "map developer", a "map data developer" or the like). (Although only one source database and geographic database developer are shown, the embodiments disclosed herein are not limited to only a single source database or a single geographic database developer.) The master version of the geographic database 100 contains data 102 (also referred to a "geographic data" or "spatial data") that represent geographic features in a coverage area 104. The coverage area 104 may correspond to an entire country, such as the United States. Alternatively, the coverage area 104 may correspond to several countries, such as the United States, Canada, and Mexico, or France, Germany, and Italy, and so on. According to another alternative, the coverage area 104 of the master version of the geographic database 100 may represent only a single region within a country, such as the West Coast or the Midwest of the U.S. Although the master version of the geographic database 100 includes data that represent geographic features in the entire coverage area 104, there may be parts of the coverage area 104 that contain geographic features that are not represented by data in the geographic database, or for which the representation of geographic features is sparse.

The master version of the geographic database 100 includes data about a road network 120 located in the coverage area 104. The data about the road network 120 include various kinds of information, such as the geographic coordinates of positions of the roads, street names of the roads, addresses ranges along the roads, turn restrictions at intersections of roads, and so on. The master version of the geographic database 100 also includes data about points of interest in the covered area 104. Points of interest may include hotels, restaurants, museums, stadiums, offices, automobile dealerships, auto repair shops, etc. The master version of the geographic database 100 may include data about the locations of these points of interests. The master version of the geographic database 100 may also include data about places, such as cities, towns, or other communities, and other geographic features, such as bodies of water, mountain ranges, etc. The master version of the geographic database 100 may include other kinds of information.

There are different ways used by the geographic database developer to collect data. These ways include obtaining data from other sources, such as municipalities. In addition, the geographic database developer may employ field personnel to travel by vehicles along roads throughout the geographic region to observe features and record information about them. The data collected by the geographic database developer are stored in the master version of the geographic database 100.

The geographic database developer 101 continues to collect data that represent the features in the geographic coverage area 104 on an ongoing basis. One reason that the geographic database developer continues to collect data is that the features in the coverage area 104 change over time. Accordingly, the geographic database developer collects data about the same features in order to update or confirm the previously collected data about the features. Another reason that the geographic database developer continues to collect data is to expand the coverage and/or detail of the master version of the geographic database 100. For example, at one point in time the master version of the geographic database 100 may include data that represents only a portion of the entire coverage area 104. After that point in time, the geographic database developer collects data about features in areas that were not previously represented in order to expand the coverage of the master version of the geographic database 100.

The master version of the geographic database 100 is maintained as the copy that has the most up-to-date data relating to the coverage area 104. Accordingly, the master version of the geographic database 100 is updated, expanded, and/or otherwise modified on a regular and continuing basis. To facilitate these operations, the master version of the geographic database 100 is stored in a format that facilitates updating, maintenance, and development. For example, the data in the master version 100 may be uncompressed. Examples of suitable formats include the Virtual Storage Access Method (VSAM) format and the geographic Data Files (GDF) format, although other kinds of formats, both proprietary and non-proprietary, may be suitable. In general, the format of the master database 100 is not suitable for use in navigation systems.

A copy of the master version of the geographic database 100 is physically located at a first location 114. In one embodiment, the master version of the geographic database 100 is stored on one or more hard drives, tapes or other media, and accessed with an appropriate computer 116. Any suitable computer may be used, such as a mainframe computer, a plurality of networked microcomputers, etc.

Figure 2:
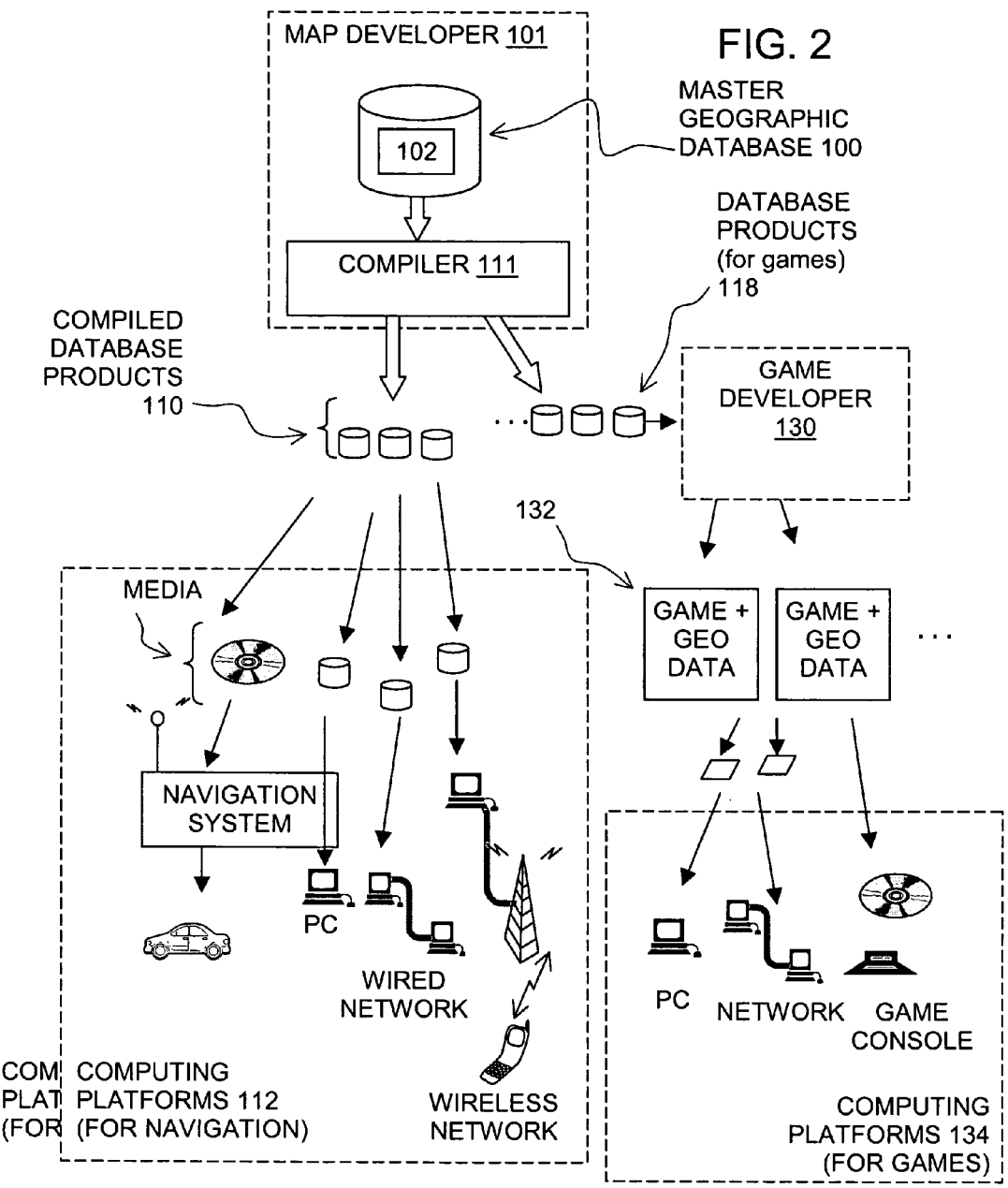
FIG. 2 is a block diagram showing an embodiment of a system for using geographic data in developing computer games.

Referring to FIG. 2, the master version of the geographic database 100 is used to make database products 110 for navigation purposes and database products 118 for computer games. The database products 110 and 118 are made using a compiler 111. The compiler 111 is a software program run on an appropriate computer platform. In the present embodiment, the database products 118 used for computer games are made using the same compiler used to make the database products 110 used for navigation purposes. In alternative embodiments, separate compilers are used to make the map database products 110 used for navigation purposes and the map database products 118 used for computer games. Processes for using a compiler to make database products are described in U.S. Pat. Nos. 5,974,419, 5,953,722, 5,968,109 and 6,047,280, the entire disclosures of which are incorporated by reference herein.

The database products 110 and 118 may include only portions of all the data in the master version of the geographic database 100. For example, the database products 110 and 118 may include data that relate to only one or more specific sub-areas within the coverage area 104 of the master version of the geographic database 100. Further, the database products 110 and 118 may include fewer than all the data attributes that describe geographic features represented in the master version of the geographic database 100.

The database products 110 and 118 are used on various kinds of computing platforms. The computing platforms 112 used for navigation purposes include in-vehicle navigation systems, hand-held portable navigation systems, personal computers (including desktop and notebook computers), and other kinds of devices, such as personal digital assistant (PDA) devices, pagers, telephones, cell phones, etc. The compiled database products 110 are also used on networked computing platforms and environments, including systems connected to the Internet.

The database products 110 that are used for navigation purposes are stored on suitable media in their respective computing platforms. For example, the database products 110 may be stored on CD-ROM disks, hard drives, DVD disks, flash memory, or other types of media that are available now or that become available in the future.

On the computing platforms 112 used for navigation, the database products 110 are used by various software applications. For example, the database products 110 may be used by software applications that provide navigation-related functions, such as route calculation, route guidance, vehicle positioning, map display, and electronic yellow pages, as well as other kinds of functions.

As stated above, in addition to producing database products 110 for use in computing platforms used for navigation, the geographic database developer 101 produces database products 118 for use in computer games. The database products 118 are provided to one or more computer game developers 130 (only one of which is shown in FIG. 2). The database products 118 used by the computer game developer 130 may be the same or similar to the database products 110 used for navigation. The database products 118 used by the computer game developer 130 may be provided on a suitable media, such as one or more CD-ROM disks, DVD disks, or hard drives. Alternatively, the database products 118 used by the computer game developer 130 may be provided over a network connection.

The computer game developer 130 uses data from the geographic database products 118, along with other data and components (as explained below), to create one or more computer games 132. The computer games 132 created by the computer game developer 130 may include some or all the data from the database products 118. Alternatively, the computer games 132 may include data derived from or based on the data from the database products 118. The geographic data in the computer game 132 may be in a different format than the data contained in the database products 118.

The computer games 132 created using the data from the database products 118 provide for representing geographic features located in geographic locales in play scenarios of the computer games. The geographic features represented in the computer games 132 produced using the database products 118 include features located in the respective coverage areas of the database products 118. These geographic features may include some or all the road networks represented by the geographic database products 118. The computer games 132 are installed on appropriate computer platforms 134. The computer platforms 134 on which the computer games 132 are installed may include personal computers, game consoles, PDAs, handheld game devices, mobile phones, networked computers, and so on. Users access the computer games 132 on the computer platforms 134 to play.

II. Computer Game Structure and Operation

A. Components

Figure 3:
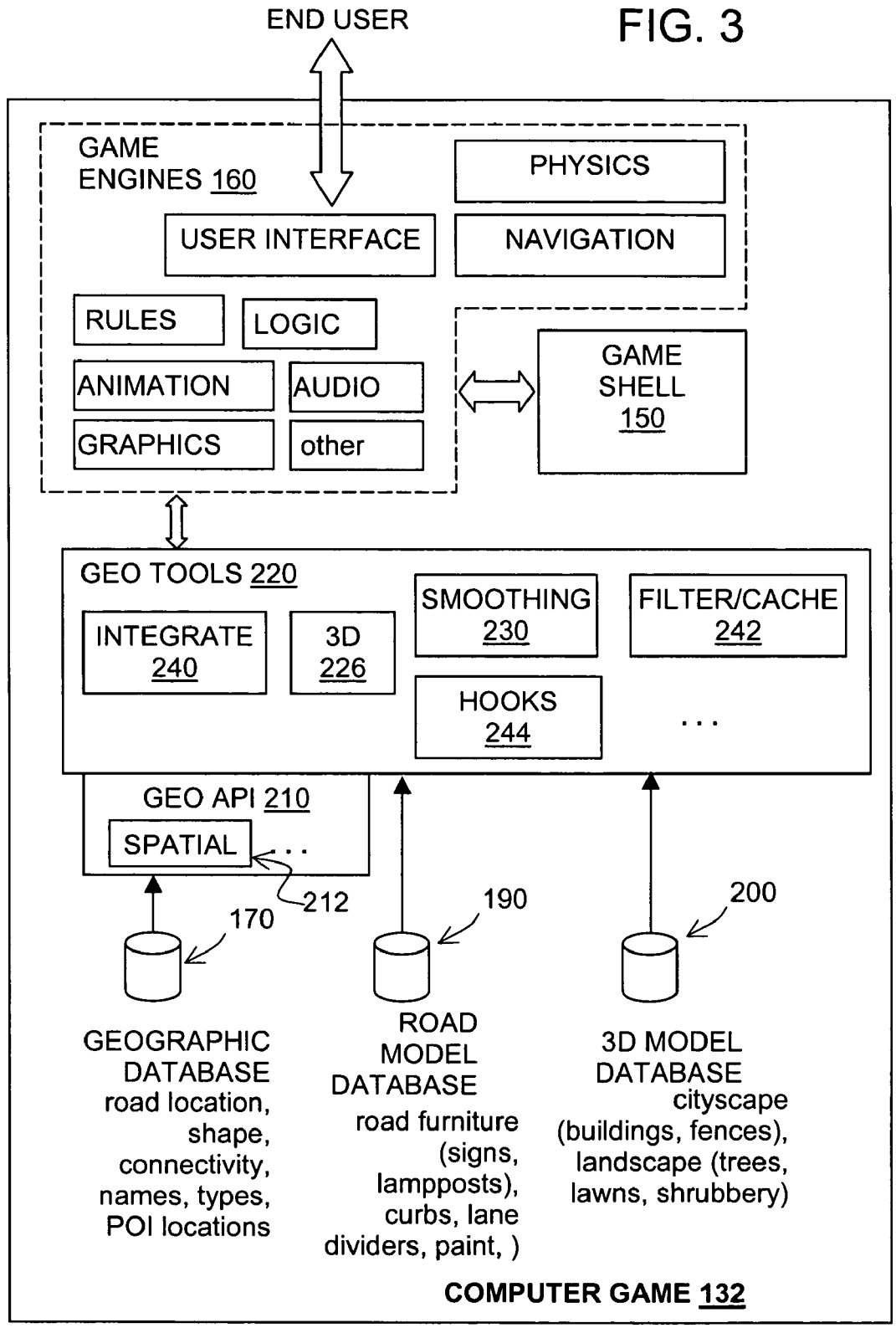
FIG. 3 is a block diagram showing components of a computer game program produced by the system of FIG. 2.

FIG. 3 shows components of an embodiment of the computer game 132 produced by the computer game developer 130 of FIG. 2. In FIG. 3, the computer game 132 includes a game shell 150, game engines 160, a geographic database 170, a road models database 190, a 3D models database 200, a geographic API 210 and geographic data tools 220. In alternative embodiments, the computer game 132 may include additional components or may include fewer components.

The game shell 150 is a data component (e.g., a data structure and/or object or program) that includes the basic logic, rules, strategy, characters, vehicles, etc., for the game. Different game shells define different games. For example, different game shells are used for a road rally game, a police chase game, a location quiz game, a "bot" fighter game, a flight simulator game, a "first-person-shooter" game, an auto theft game, an urban development simulator game, etc.

The computer game 132 also includes game engines 160. The game engines 160 are software programs (i.e., routines, applications, and/or associated libraries, etc.) that are part of the computer game. In general, the game engines are software programs (and/or their associated libraries) that perform specific, regularly performed tasks and that operate on an as-needed basis (e.g., continuously) during game play. For example, a game engine program may run continuously waiting to receive some input (e.g., from another program, from a game player, etc.) and, in response to the input, may change some output. Examples of game engines include audio engines, logic engines, rules engines, animation engines, graphics engines, user interface engines, physics engines, and so on. The game engines may also include one or more navigation engines or applications that make specific use of the geographic data for certain purposes, such as a route calculation application that determines a route that is used as part of a play scenario of the game.

The geographic database 170 in the computer game 132 is formed from the database product 118 provided by the map database developer 101 to the game developer 130 (in FIG. 2). The geographic database 170 in the computer game 132 may be the same as the database product 118 provided by the map developer 101 or may be derived from the database product 118 provided by the map developer 101. The geographic database 170 in the computer game 132 may be in the same format as the database product 118 provided by the map developer 101 or may be in a different format. In the computer game product, the geographic data may be integrated into the code base or may exist separately.

The geographic database 170 includes representations of geographic features in a locale. The types of geographic features that are represented include, for example, the road network, points of interest, lakes, administrative boundaries, and other geographic features. The locale represented by the geographic database 170 may include a metropolitan area (such as New York, Chicago, Los Angeles, or Paris), a country, a state, or any other geographic area. The geographic database 170 may represent pedestrian walkways, bicycle paths, and/or aircraft runways. The geographic database may also represent an imaginary locale, such as a locale that is similar to a real locale. Processes for forming a geographic database that represents an imaginary locale are described in the copending application entitled "GEOGRAPHIC AREA TEMPLATES FOR COMPUTER GAMES", bearing application Ser. No. 10/798,632 filed Mar. 11, 2004 the entire disclosure of which is incorporated by reference herein.

In the computer game 132, the road models database 190 includes data representations used for visual appearance and rendering of road-related things, such as road colors, road pavement, lane stripes, curbs, sidewalks, signs, lampposts, lane dividers, traffic signals, speed bumps, crosswalks, and so on. According to one embodiment, the road model database 190 includes several different data models for some types of road-related things. For example, the road models database 190 includes several different types of traffic signal configurations. These different types of traffic signal configurations are used to provide variety and to make the representation of the road network appear more realistic, i.e., so that all the traffic signal configurations do not look the same. The data representations of road-related things in the road models database are also used for providing other properties of the represented things, such as the physical and audio properties. For example, causing a simulated vehicle to move over a simulated curb causes the simulated vehicle to "bump." Similarly, a simulated vehicle "hitting" a simulated lamppost causes a simulated crashing sound.

The 3D models database 200 includes data representations used for visual appearance and rendering of cityscape and landscape-related things, such as buildings, fences, trees, shrubbery, lawns, fences, clouds, scenery, and so on. The data representations of cityscape and landscape-related things in the 3D models database are also used for providing the other properties (e.g., physical and audio) of the represented things. For example, causing a simulated vehicle to strike a simulated building causes the simulated vehicle to stop and make a crashing sound. As another example, a simulated vehicle can drive over a simulated shrub, but not a simulated tree.

B. The Geographic Data API and Geographic Data Tools Programs

1. The Geographic Data API

The geographic data API 210 is used by a requesting game engine 160 to obtain needed geographic data from the geographic database 170. In general, the geographic data API 210 provides a structured, relatively high-level interface by which the game engines 160 can request geographic data from the geographic database 170. In one embodiment, the geographic data API 210 provides a set of function calls and queries in a programming language, such as C, by which the game engines 160 can request geographic data. In one embodiment, the geographic data API 210 is similar or identical to the interface layer described in U.S. Pat. No. 6,047,280, the entire disclosure of which is incorporated by reference herein.

Among the functions provided by the geographic data API 210 is a spatial query function 212. The spatial query function 212 returns data records of a specified type (e.g., data that represent road segments) based on location criteria included in the query. For example, a spatial query may request all the data records that represent road segments that are within 5 km of a given latitude and longitude. Another spatial query may request all the data records that represent restaurants that are within a rectangular area having specified geographic boundaries. The spatial search function 212 in the geographic data API 210 returns to the requesting component (e.g., a game engine) the data records that meet these criteria.

2. The Geographic Data Tools

In addition to the geographic data API 210, one or more sets of geographic tools 220 are also included in the computer game 132. The geographic data tools 220 are used in combination with the geographic data API 210 to manage and process geographic data accessed from the geographic database 170. Included among the geographic tools are a 3D conversion function 226, a smoothing function 230, an integration function 240, a spatial filtering and caching function 242 and program hooks 244. There may be more geographic tools in addition to these.

a. 3D Conversion

The 3D conversion function 226 supports conversion of the data obtained the geographic database 170 so that it can be displayed as a 3D (perspective view) image. The 3D image may represent a portion of the geographic locale from the point of view of the game player or may be from the point of view of another, e.g., a spectator. The 3D image, in general, would include the features that a human person could observe from a specific location in the locale. The view may be an overhead view. The 3D image, in general, would include the features that a human person could observe from a specific location in the locale.

In one embodiment, the 3D conversion function 226 allows the computer game to simulate travel along roads from a driver's perspective. For example, a driving game could provide a simulation of a race along a route from Chicago to St. Louis.

b. Smoothing

The smoothing function 230 modifies the way geographic features that are represented in the geographic database 179 are depicted on a display of a computer game. In the geographic database 170, a linearly extending feature, such as a road segment, is represented using discreet points that indicate the end points of the feature with the understanding that the geographic feature extends between these points. A curved road segment (or other feature) is represented using a series of discreet points that indicate positions along the road segment with the understanding that the road segment passes through these points. The smoothing function 230 provides for a realistic-looking representation of geographic features, such as road segments, by calculating a curve through the points that represent the road segment. The smoothing function 230 is also applied to other geographic features that are represented using a series of straight points.

c. Integration

As mentioned above, in the computer game 132, the integration function 240 provides for associating representations of road-related things from the road model database 190 and the 3D models database 200 with data from the geographic database 170 that represents the road network. The data in the geographic database 170 is (or was derived from) a representation of a road network used for navigation purposes. As such, the data in the geographic database 170 may not indicate what roads, or things associated with a road, look like. For example, in the geographic database 170, a data representation of a road may indicate the locations (e.g., geographic coordinates) of intersections, and possibly the locations of points along a road segment between intersections, the legal (and illegal) connections between roads, the names of roads, the addresses ranges along roads, the type of road surface, and so on. However, in the geographic database 170, a data representation of a road may not contain information that indicates the actual visual shapes, colors, dimensions, etc., of these road-related things. For example, in the geographic database 170, a data representation of a road may not indicate the colors of a road, curbs, sidewalks, what a sign looks like, and so on. The road model database 190 is used to provide these types of information.

The integration function 240 associates road model data from the road model database 190 with specific locations along a road segment (as represented by data from the geographic database 170) or with lengths along a road segment. As an example, the integration function 240 may provide for showing curbs (using a model for what a curb looks like from the road model database 190) along all side streets (represented by data from the geographic database 170. In another example, the integration function 240 may provide for showing barriers along all the sides of expressways (using a model for barriers from the road model database 190) as represented by data from the geographic database 170. The integration function 240 may also provide for associating data models for traffic signals at intersections.

The computer game 132 uses the integration function 240 in the geographic tools programs 220 to combine data from the road model database with data from the geographic database 170 to provide a realistic appearing road network. The road model database 190 is not necessarily intended to represent actual road-related things, such as the exact locations of signs, the exact text on signs, the exact configuration of traffic signals, etc. Neither the geographic database 170 nor the road model database 190 may contain information that represents the actual location of signs or the exact configuration of traffic signals. However, the road model database 190 provides data for visually representing these road-related things in a manner that would be typical for the geographic locale. Therefore, for a residential neighborhood, the road model database 190 would include models for sidewalks, cross walks, stop signs, etc., which would be associated with appropriate locations along the road network as defined by the geographic database 170. The integration function 240 and the road model database 190 provide for both the density (how many signs per mile or how many lampposts per block) and the style (shape, height, sign text wording) of these road related things.

Different road models databases may be used in computer games that depict different locales because the road-related things in different locales may have different appearances. For example, a road models database for London will include data models for the way road signs look in London, whereas a road models database for New York will includes data models for the way road signs look in New York. Similarly, a road models database for an aircraft simulator game will include models for the way airports look from overhead, whereas a road models database for a pedestrian game will include data models for the way an airport looks on foot.

The integration function 240 is also used to combine data from the 3D model database 200 with data from the geographic database 170 to provide a realistic appearing road network. Like the road models, these 3D model representations are associated with locations along the road network data as represented by data from the geographic database 170. Furthermore, like the road models database, there are different 3D models databases for different types of locales. For example, a 3D models database for Paris will include 3D data models for the way buildings look in Paris, whereas a 3D models database for Texas will include data models for the way buildings look in Texas.

The integration function 240 provides for rendering of road related things and 3D models at the rate needed by the computer game. If the game is intended to depict high-speed travel along a road, the integration function operates to render the road related things and 3D models appropriately.

Figure 4A:
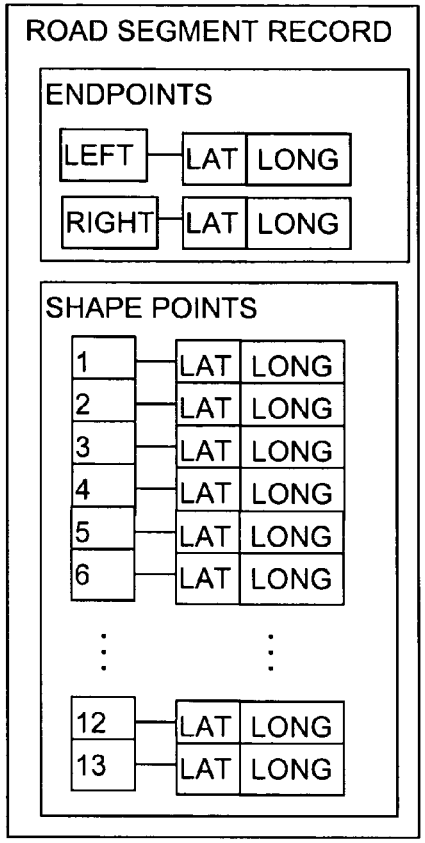
FIGS. 4A, 4B and 4C illustrate an example in which the embodiment of FIG. 3 uses geographic data for a computer game.
Figure 4B:
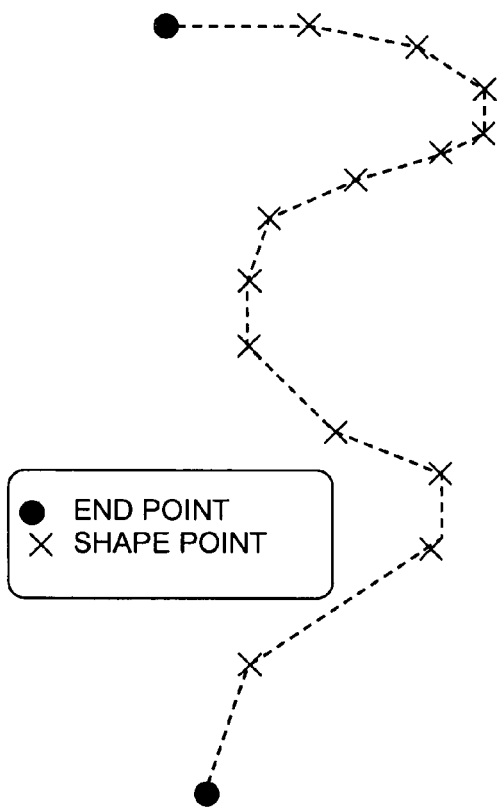
Figure 4C:
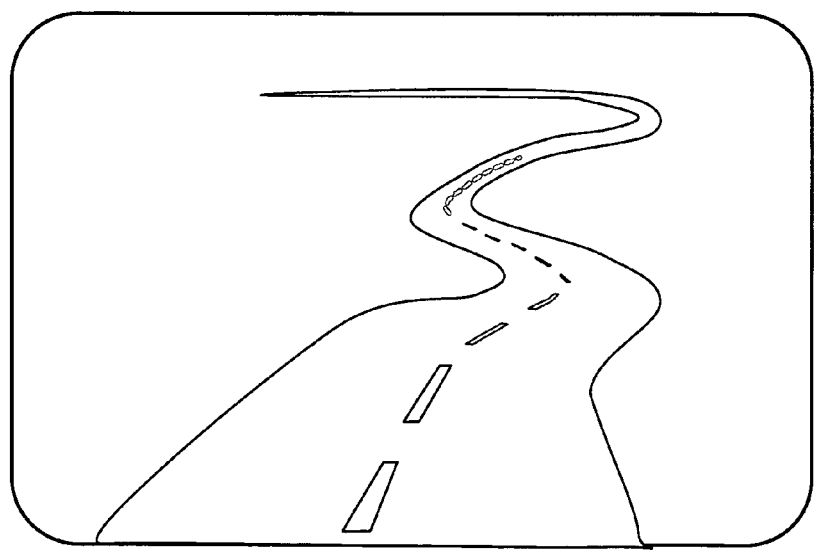

FIGS. 4A, 4B and 4C illustrate operation of some of the geographic tools functions 220. FIG. 4A illustrates an example of data in the geographic database 170 used to represent a road segment. In FIG. 4A, a data record represents a road segment by indicating the latitude and longitude of the end points of the road segment. Because the road segment is curved, additional data is included. This additional data is in the form of a series of points (referred to as shape points). The shape points indicate positions, e.g., latitude and longitude, of points located along the road segment between the end points. FIG. 4B illustrates graphically the data in FIG. 4A. As shown in FIG. 4B, the road segment is depicted as consisting of a series of straight line pieces connecting the shape points and end points. FIG. 4C illustrates the how the road segment represented in FIGS. 4A and 4B would be depicted graphically in a computer game using the data tools 220. The 3D function 226 is used to provide a driver's perspective view of the represented road segment and the smoothing function 230 is used to smooth out the piecewise shape of the road segment as represented in the geographic database 170. In addition, the integration function 240 is used to add road model representations of lanes, pavement color, and lane stripes.

Figure 5A:
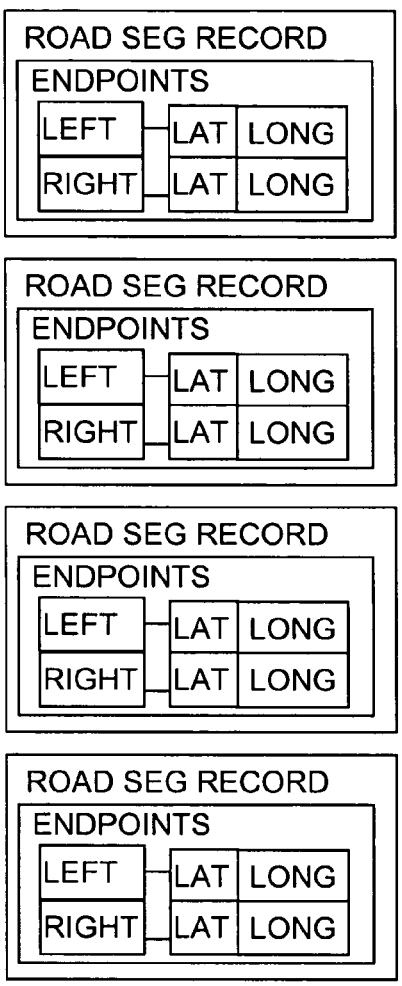
FIGS. 5A, 5B and 5C illustrate another example in which the embodiment of FIG. 3 uses geographic data for a computer game.
Figure 5B:
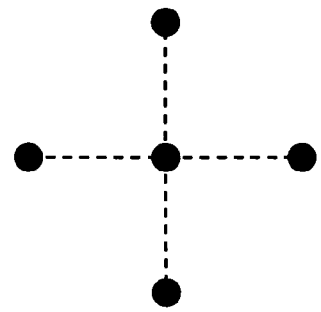
Figure 5C:
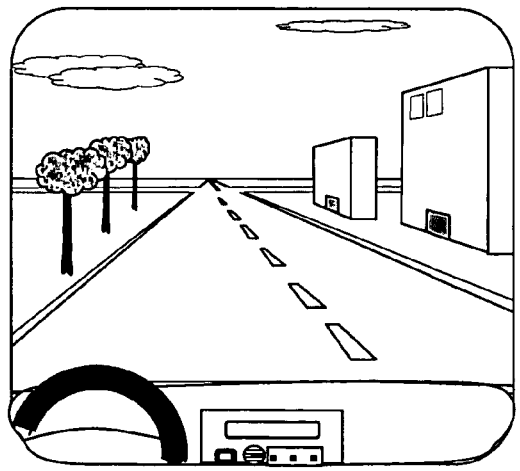

FIGS. 5A, 5B and 5C further illustrate operation of some of the geographic tools functions 220. FIG. 5A illustrates another example of data in the geographic database 170. In FIG. 5A, four data records represent four road segments that meet at an intersection. As in FIG. 4A, a data record represents a road segment by indicating the latitude and longitude of the end points of the road segment. FIG. 5B illustrates graphically the four road segments represented by the data in FIG. 5A. As shown in FIG. 5B, the road segments are depicted as consisting of straight line pieces. FIG. 5C illustrates the how the intersecting road segments represented in FIGS. 5A and 5B would be depicted graphically in a computer game using the data tools 220. The 3D function 226 is used to provide a driver's perspective view of the represented road segments. The integration function 240 is used to add road model representations of lanes, pavement color, and lane stripes. In addition, the integration function 240 is used to add 3D models of buildings and trees along the road segments.

d. Spatial Filtering and Caching

As mentioned above, the geographic tools 220 include spatial filtering and caching functions 242. The filtering function selectively filters data from the geographic database 170, the road models database 190 and the 3D models database 200. This filtering function may receive inputs from one or more of the game engines 160. As an example, if a game engine indicates that a game scenario is simulating a fast moving vehicle, the filtering function 242 may selectively filter (suppress) some of the data accessed or processed from the geographic database 170, the road models database 190 and the 3D models database 200 so that the simulated speed can be maintained. The caching function may receive input from a game engine that indicates a simulated vehicle direction of travel. The data needed to represent geographic features located in the simulated direction of travel are identified and cached in memory to improve game performance.

e. Program Hooks

The geographic tools 220 may also include program hooks 244. The program hooks 244 include conditional statements included in certain routines. When one of the hooks is run, it checks for a certain condition and may modify operation of the computer game depending on the result of an evaluation of the condition. As an example, a program hook may be used to incorporate real-time traffic or weather conditions into a computer game. According to this example, a computer game that simulates driving a vehicle through a locale can obtain real-time traffic or weather information relating to the locale, which can be used to modify the driving simulation accordingly. Program hooks can also be used in multi-player games. In a multi-player game, program hooks check for, and then incorporate, the actions of other players.

III. Alternatives

Some embodiments provide for on-line game play. In one alternative, on-line game play is facilitated with an Internet display function in the geographic data tools: The Internet display functions allow incremental updates of displays for game play. For example, a first display screen shows full detail of a certain geographic area in 2D or full 3D. Further updates to the screen only include necessary information to indicate changes to the current display. This method of sending only changes allows faster updates necessary for game play over the Internet. A function like this allows a set of gamers in different places connected only by Internet connections to play competitive games based on geographic data with each other in real-time.

The embodiments disclosed herein can be used on various different types of computer platforms, including client-server platforms and peer-to-peer platforms. The embodiments disclosed herein can be used with streaming or other technologies.

The embodiments disclosed herein describe use of geographic data in computer games. The embodiments disclosed herein can be adapted for using geographic data for other non-navigation-related purposes. Among these other, non-navigation purposes are simulations and movie making. For example, the embodiments disclosed herein can be adapted for using geographic data for simulation systems. Simulation systems that can use geographic data include systems that simulate emergency operations (such as evacuation procedures or emergency vehicle deployment and routing), driver education systems, etc.

The embodiments disclosed herein can also be used in movie making. Many movies use computer-generated images of real (or imaginary) locations, instead of actual images. The embodiments disclosed herein can be adapted for creating realistic-looking geographic locations, including features such as road networks, for use in movie making. When using any of the disclosed embodiments for movie making, a relatively high visual accuracy may be required and therefore attributes that provide for relatively high visual accuracy may be needed. However, fewer attributes of some types may be required.

The embodiments disclosed herein may also be used for games that use geographic data obtained from multiple sources, e.g., more than one source geographic database. In these embodiments, the data from the multiple source geographic databases may be combined by the game developer or by another party.

In another alternative embodiment, end users may be provided with the tools (e.g., software program, etc.) to make their own maps (geographic databases) that can then be used in their computer games. The geographic databases made by end users may represent actual, real world places or imaginary places. The tools provided to the end users for this purpose would allow end users to create geographic databases that would be accessed by the geographic data APIs in their computer games in the same manner as geographic databases from the map developer or the computer game developer are accessed.

IV. Examples

The following are examples of different types of computer games and/or applications that can be developed using the disclosed embodiments. (Note that some of the games are new and some are updates and/or improvements of prior games.)

A. City Development Simulation Game

Geographic data that represents actual, real-world locales can be used in a type of computer game in which players simulate growth of an urban (or other regional) environment. In this kind of game, players simulate building cities or other places (such as towns, countries, rural areas) by designing roads, utilities (e.g., electrical, sewage, water) and other infrastructure elements for a geographic area. Then, the computer game allows a virtual city to develop based on the designs. The virtual cities can be detailed including individual zoning requirements (e.g., residential, commercial, industrial, etc.), crime layers (i.e., that can be changed by implementing police stations), traffic, unemployment and other realistic features.

Geographic data that represents actual, real-world locales can be used in this type of game to provide a high level of realism thereby allowing game players to build cities based on real world city models. In this type of game, players may choose a specific city model (e.g., Paris), and attempt to improve or replicate it. The inclusion of real time traffic, weather, points of interest (periodically updated or real time) and other real world content would serve to increase the realism of such a virtual city. This improvement could add realism, player loyalty, recognition, and an alternative goal to this popular type of game.

B. Virtual Person Development Simulation Game

Geographic data that represents actual, real-world locales can be used in a type of computer game in which game players simulate development of a virtual person (e.g., a "sim"). In this kind of computer game, players build a virtual person by managing that virtual person's habits, tendencies, house, family, job and interactions with other virtual people. In prior simulation games of this type, the locales in which virtual people live were non-specific. In prior simulation games of this type, the locales were modeled from the view of the player's virtual house and may have included some features specific to the game manufacturer.

Data from a source of geographic data that represents actual, real-world locales can be used in this type of game to provide a high level of realism, thereby allowing players to build virtual characters in models of real cities, with models of actual real-world points of interest, streets, landmarks and neighborhoods. When starting this type of game, which has been enhanced by the addition of geographic data that represents actual, real-world locales, a player chooses a real world city. Once the city has been chosen, neighborhoods from the city become available for the player to select (e.g., Chicago's Gold Cost, Lincoln Park, Rogers Park, River North, or specific suburbs). Once the player selects a neighborhood, the player's virtual person would be able to simulate visits to virtual attractions based on real world local attractions, e.g., go to popular restaurants and bars, work in local businesses, and reflect how life is lived in that specific area almost as if he/she were living there.

C. "Bot-fighter" Game

Geographic data that represents actual, real-world locales can be used as a backbone for a "bot-fighter"-type game. This enhances the bot-fighter-type game by incorporating detailed spatial data that represents real world locales. A "bot-fighter"-type game can be played on mobile phones. In this game, players build "warrior robots" on their mobile phones using credits (e.g., virtual money) from battles won against other players. All firing between warriors is done via SMS messaging over the mobile phones. With mobile phone technology, a player may be given rough coordinates to his or her player-enemies or be warned when a player-enemy has entered his/her area or turf via mobile phone positioning technology.

The addition of geographic data that represents actual, real-world locales can give this type of game greater appeal. Specific route data and location details or spotting could be provided instead of simple proximity alerts. The addition of geographic data that represents actual, real-world locales would enable this type of game to support more precise boundaries. Further, with the addition of geographic data that represents actual, real-world locales, a game player's weapons could be given more accurate range limitations, rather than rough limitations available with existing games.

In addition, game credits (e.g., virtual money) could be spent on routes, enemy interception (based on known movements or historical patterns) courses, or enemy spotting locations.

D. Traffic Management Game/application

In this computer game/application, data that represents the road network in the real world is used in combination with traffic feeds and models in order to simulate a real city with its existing traffic patterns. Once a model of an actual city with its road network and traffic patterns is created, predictive modeling and comparisons to other cities allow the user to tweak, re-model, or re-design traffic architecture to improve the road network with the objective to create the most efficient traffic system or to make the most improvements to an existing system.

This computer game/application can include a vehicle fleet management feature. According to this feature, the game player is given a virtual fleet of vehicles (e.g., starting with two trucks) in an initially chosen city and an overlay of existing traffic conditions. The goal of the game with the fleet management feature would be to provide service to a customer base (i.e., based on real world businesses represented in the real world geographic database and some zoning data). Time of day for delivery, fleet routing, fuel expenditures, pickup points and schedules etc., would all be managed by the game player.

Traffic flow, incidents, bottlenecks and other traffic data would be displayed. Wired or live devices would also have the ability to add live or updated data. Traffic would be made up from individual vehicles, following typical vehicle movement patterns (e.g., gapers, cars driving down the shoulder, etc.) or could be built from scratch.

E. Emergency Services and Law Enforcement Games

Geographic data that represents actual, real-world locales can be used in emergency services scenario-type games or law enforcement scenario-type games. These games include themes related to fire fighting, medical emergency services (e.g., ambulance, search and rescue), police chases, etc. Game developers who make these kinds of games can use the disclosed embodiments to provide realistic looking locales, possibly with the addition of location-based content (e.g., actual buildings, businesses etc.), traffic, weather, points of interest, etc., as part of the playing scenarios of these games.

F. Location Quiz Game

Geographic data that represents actual, real-world locales can be used in a location quiz-type of computer game. In this type of game, game players are provided with clues about a game character's secret location and attempt to determine the secret geographic location. Using geographic data that represents actual, real-world locales adds a measure of realism to this type of game and increases its educational value.

One feature of this game is the ability to personalize the game to a player's locale. Players would be able to search for the secret location in their own city or neighborhood. For example, parents could use the game to teach their children how to get around in their own neighborhoods. According to this example, parents could set up the game to include the route that their child takes to and from school. Also, if a family moves to a new neighborhood, the parents could obtain up-to-date digital map data that represents the new neighborhood in order to teach their children about the new neighborhood.

Adding digital map data to the game would also provide the capability to play it anywhere the player is located. For example, a child from Chicago who is on vacation in Paris could search for the game character in Paris and thereby learn about the city.

G. Children's Atlas

Another computer game/application that can use geographic data that represents actual, real-world locales is a children's atlas game/application. This computer game/application can be used by families on long car trips. In one embodiment, this game/application could be used to answer children's questions such as "Are we there yet?" or "Where are we?" with distances and times to destinations.

One version of this game includes a communications feature that allows a child to communicate with other children who have games with the same feature. Another version of this game/application allows a game player to create a virtual travelogue that describes and records travels in real time.

In one embodiment, a children's atlas game/application would be developed as a travel companion game that obtains location information from an in-vehicle navigation system or remote server. As a car in which the child is a passenger drives through a specific locale (e.g., a town or attraction) or a more general area (e.g., a state), the children's atlas application would display images and use voice narration to provide facts about the area. The children's atlas game/application would also provide well-known stories or legends about an area (e.g., Johnny Appleseed as the child is traveling through the Appalachians).

In another alternative embodiment, the children's atlas includes a travel pal feature. This feature allows a child traveling through an area to connect online with other children who located in the area. In one version of this feature, children can communicate with other traveling children or with other children located in the area a child is passing through using instant messaging. A buddy list may be formed and used for this purpose. Children could access this service while traveling or at home. For example, children could exchange information about their travels or play games. Children passing through a particular place could instant message with children living in the area and ask questions about the area, e.g., what do the locals think about the best places to eat, what is the best radio station, etc.

According to another alternative embodiment, the children's atlas application includes a virtual travelogue feature. The virtual travelogue feature allows a child to collect, store, and send information about his or her travels as a trip is taking place. The child could take information provided by the atlas game/application, annotate it with personal experiences and observations, and send it to friends and relatives, or to a home website that eventually turns into a scrapbook of the entire trip (or perhaps a report on a school field trip), complete with maps, pictures and postcards from the area, voice narration, and any other data collected along the way.

The virtual travelogue feature could also catalogue and automatically store every place the child has traveled. The child could then display or print out a map that shows all the places he or she has been and how he or she got there.

H. Simulated Tour

Another application that can use geographic data that represents actual, real-world locales is a simulated tour application. This simulated tour application uses geographic data, POI data, 3D modeling, and other data, such as weather, traffic, crime statistics, and restaurant guides, to build a realistic view of a city or other locale for virtual touring. The simulated tour application could be used by people considering moving to a new area, or could be hosted by realtors, or used by travelers, or simply used by individuals to learn more about different locations.

With this application, one can learn, understand, explore, or market a specific area. This application would portray an area visually, textually, and possibly even audibly. Smells (e.g., heavy fog, chocolate factory nearby—pervasive) could be provided using appropriate technology or described textually.

One use for this application is to provide a way for a person to become familiar with driving in an unfamiliar city. Some cities may have driving conventions that are unfamiliar to some people. For example, speed limits are painted on the road in California and Hawaii whereas they are located on little signs in Illinois. According to another example, traffic is particularly aggressive in Rome and lanes are viewed as guidelines, not rules etc.

I. Car Rally Challenge Game

Another computer game that can be improved using geographic data that represents real world places is a car rally challenge-type game. This game can be played in single player or multi-player versions. In this type of game, teams of game players travel actual routes that are sent to them from a central server. The server would store a number of car rally routes and attribute scenarios (e.g., points of interest as checkpoints) for a specific area (e.g., state, city, neighborhood, etc.), and these virtual rally instructions would be sent to the participating drivers and navigators.

An organizer's kit could also be offered that would cater to amateur car rally organizations or clubs. The kit would allow an individual or organization to create a customized car rally specific to a city or area. The rally information could be created on the rally organizer's personal computer within a program, or via download from a website. It could then be printed out and handed to the racers or downloaded to a device such as a PDA.

The difference between the game and the kit is that the game would send out pre-determined routes and rally features. The routes and features might change regularly but the players would not have a hand in planning or creating the rally scenarios. The kit would provide the basic tools and content to create a rally, thereby allowing the user to add local flavor, degrees of difficulty, or to even recreate a well-known rally course.

J. Location-based Virtual Monopoly Game

Geographic data that represents real world places can be used in a computer game based on the Monopoly board game. In one version of this game scenario, a game player's positions and movements in the real world are tracked, using positioning equipment such as GPS, cell phone triangulation, etc. These movements would be used to define game routes for that player. Then, the routes would be used to identify properties (e.g., actual or fictional) along that route the game player could virtually purchase, rent, etc., as in the classic board game. Real world conditions, such as traffic restrictions, road construction, tolls, etc., would be factored into the game play scenario.

K. Promotional Games and Contests

Geographic data that represents real world places can be used for promotional concepts (e.g., contests, sales events, and so on). Businesses, such as retailers or restaurant franchises, frequently use special promotions or contests to attract business. Adding location-based data and services to these promotions would allow businesses to better target, reach, and track potential customers, and also add an extra dimension. Promotional tie-ins to location-based data could be developed using a variety of approaches.

L. Spatial Simulator for Exercise

Data that represents actual, real world places can be used with sports or exercise-related events or equipment. For example, geographic data can be used to enhance simulators (e.g., monitors) used on or with exercise equipment. Geographic data that represents real places can be used with a treadmill or exercise bicycle to simulate the experience of running or biking along a route. The route would be projected on a monitor or screen in front of the person on an exercise machine such as a treadmill or exercise bicycle.

Use of data that represents actual, real world places could allow users to feel as if they were running through the streets of a major city, e.g., along a marathon or 10K route, or biking the route of the Tour de France. The simulator could also be used to keep track of long-term training goals, such as running virtually across the entire United States.

A basic simulation would consist of a display of a basic overview map based on a route. For example, the user would ask for a route within a city and a basic map would be displayed showing the streets of the city with a mark on the map indicating the virtual position of the runner or bicyclist. The runner's progress along the route would be based on the runner's pace. The degree or category of simulation offered could vary depending on the level of realism desired. For example, details such as road elevation could be added to the simulation. This would allow the person exercising to experience the feeling of running or biking in the Rocky Mountains or through the plains of Nebraska.

A detailed simulation would use 3D data and give a full picture on a monitor of the buildings and landmarks along the route. This would give the runner or bicyclist a realistic feeling of running or biking along the route.

M. Classic Computer Games

Geographic data that represents actual, real-world locales can be advantageously used to make new versions of classic computer games like Snake and Pacman. In these new versions of these games, game players assume the identities of characters in the game. A player uses positioning equipment that determines the player's actual physical position in the real world. The player also has equipment that provides for wireless communication with a central database. This player becomes a virtual player in a classic game such as PacMan or Snake. The games would be played in either an online competitive mode or a single player (player versus machine) mode. In either case, the player acts as a character in the game. The distance and speed moved by the player would be translated to movement and speed in a virtual world, where the player may accomplish goals within the game or defeat other players. The system would be set up in translated "virtual boards" where a game would consist of an area regulated by the speed of transportation (a "board" for a vehicle can be significantly larger than one for a pedestrian).

N. Location Based Cannonball Run Car Racing Game

Another computer game that can use embodiments of the disclosed system and method for providing geographic data is a "cannonball run" car racing game. This game may be played in multi-player or single player mode. The multi-player mode game may be played online. In the game playing scenario, players compete against each other to race vehicles (e.g., cars, bikes, etc.) across a geographical area. Data that represent actual, real-world places would be used to add realism to the game, e.g., actual legal and physical restrictions. Alternative features include the addition of real-time traffic and weather conditions.

One scenario for a multi-player online version of the game would feature a community where players start out with a specific mode of transportation. This version of the game would provide an online culture and goal of being with the best group and driving the best vehicle. Players would start with a certain amount of virtual cash and a basic vehicle. Some races would be pre-defined events, whereas other races would be random city races with a user defined start and end points. The selection of routes for races would be based on real map data. The game would be based on winning virtual money by winning races, but winning a race could cost the player due to traffic tickets, illegal traffic maneuvers or other expenses. All fines would be based on legal restriction data and statistics of the percentage of drivers caught. Suggested routes would be provided in all races, and the amount of virtual cash used to buy a route would vary the quality or speed of the route.

Game players would have the option of racing through their hometowns, or through the streets of their favorite cities or countries all over the world. These would attract a larger demographic, and interest the casual game player as well.

O. Virtual Trip Planner and Simulation

Data that represents actual, real world places can be used for a computer simulation application that would allow a user to preview a trip or specific route by virtually driving it on his or her personal computer or game console. The simulation would be based on a representation of the geographic database that included 3D renderings of buildings, signs, topographical features, and other related attributes. The simulation software could be provided on media, through an online vendor, or rented to users on an as-needed basis. Users would enter a route request via their personal computers or consoles and could use gaming steering wheels, joysticks, voice commands, or keyboards to drive the routes. A fast forward function could be used to skip the obvious or mundane sections of the trip or to speed up the pace.

To make the simulation more realistic, traffic features, such as vehicles coming and going on the route, could be included. These could perhaps even be based on actual traffic patterns or real-time traffic for a selected time of day.

A feature of this simulation application would be as a form of trip planner. The planner would provide information about an area to which one is traveling, such as local history, area specific trivia games, and point of interest descriptions and recommendations. Users would have the option of using this information while driving the area in advance (e.g., using the simulation application, described above), printing out the planner in advance as a reference, or loading it onto a device and accessing it during an actual trip (e.g., going on a long trip and using the planner interactively to keep children amused and informed). For example, if a family was traveling on vacation from Chicago to Miami by car, the parents could research and preview the attractions, hotels, and restaurants at which the family may want to stop along the way. They could also preview the route and create their own form of trip ticket to plan the best route. The parents could then set up an itinerary that would include games, information, quizzes etc., that would occupy the children throughout the trip.

It is intended that the foregoing detailed description be regarded as illustrative rather than limiting and that it is understood that the following claims including all equivalents are intended to define the scope of the invention.

We claim:

1. A computer-game system comprising:
   a map database containing geographic data including a plurality of road segment records that represent portions of roads in a real-world geographic locale, wherein each of the road segment records corresponds to navigation-related attribute data that support vehicle navigation-related functions for real-world navigation on the roads in the real-world geographic locale, the navigation-related attribute data including:
   (i) geographic coordinates,
   (ii) a street name,
   (iii) an address range,
   (iv) a turn restriction, and
   (v) road shape;
   a user interface;
   a game engine program configured for running on a computer platform and for providing a computer game to a user via the user interface;
   a computer processor presenting a game play scenario on the user interface from the game engine program based on the geographic data, wherein game play includes engaging game characters within the game play scenario, and wherein the game play scenario corresponds to a virtual position independent of the user's actual physical location; and
   an application programming interface program configured for running on the computer platform and accepting requests for data from the game engine program, accessing the data from the map database, and providing the data in a suitable format to the game engine program;
   wherein the map database, the user interface, the game engine program, and the application programming interface program are stored on at least one computer-readable medium, and
   wherein individual road segment records are accessed from the map database during game play of the computer game to provide real time geographic data for display in the game play scenario.

2. The computer-game system of claim 1 further comprising:
   a 3D function configured for converting geographic data from the map database to a perspective view for display in the computer game.

3. The computer-game system of claim 1 further comprising:
   a smoothing function configured for determining a curve through data points used in the map database to represent a linearly extending feature, wherein the curve is used for display of the linearly extending feature in the computer game.

4. The computer-game system of claim 1 further comprising:
   an integration function configured for combining road model data with data that represent roads from the map database to provide a realistic visual appearance of road-related things.

5. The computer-game system of claim 4 wherein the road-related things include at least one selected from the group consisting of: road colors, road pavement, lane stripes, curbs, sidewalks, signs, lampposts, lane dividers, traffic signals, speed bumps, and crosswalks.

6. The computer-game system of claim 1 further comprising:
   an integration function configured for combining 3D model data with data that represent roads from the map database to provide a realistic visual representation of polygon shaped features in the geographic locale.

7. The computer-game system of claim 1 further comprising:
   an integration function configured for combining 3D model data with data that represent roads from the map database to provide a realistic visual representation of cityscape and landscape features in the geographic locale.

8. The computer-game system of claim 1 further comprising:
   an integration function configured for combining 3D model data with data that represent roads from the map database to provide a realistic visual representation of one of the group consisting of: buildings, fences, trees, shrubbery, lawns, fences, and clouds in the geographic locale.

9. The computer-game system of claim 1 wherein the application programming interface program is further configured for providing for spatial queries of data from the map database.

10. The computer-game system of claim 1 further comprising:
    a game application shell that includes basic logic, rules, strategy, and characters for a type of computer game, wherein the game application shell is configured for access by the game engine program.

11. The computer-game system of claim 10 wherein the computer game is of a type selected from a group consisting of: a road rally game, a police chase game, a "bot" fighter game, a flight simulator game, a "first-person-shooter" game, an auto theft game, and an urban development simulator game.

12. The computer-game system of claim 1 wherein the game engine program is configured for performing specific tasks and for operating on an as-needed basis during game play.

13. The computer-game system of claim 1 wherein the game engine program comprises at least one selected from the group consisting of: audio engines, logic engines, rules engines, animation engines, graphics engines, and user interface engines.

14. The computer-game system of claim 1, wherein the real-world navigation includes vehicle route calculation and vehicle route guidance corresponding to the roads in the real-world geographic locale.

15. A method of operating a computer game that runs on a computer platform, the method comprising:
 presenting a game play scenario on a user interface from a game engine program based on geographic data to a user for game play by a computer processor, wherein the game play includes engaging game characters within the game play scenario, and wherein the game play scenario corresponds to a virtual position independent of the user's actual physical location;
 using an application programming interface that runs on the computer platform to accept requests for geographic data from the game engine program;
 using the application programming interface to access the geographic data from a map database stored on data storage hardware, the geographic data including a plurality of road segment records that represent portions of roads in a real-world geographic locale, wherein each of the road segment records corresponds to navigation-related attribute data that support vehicle navigation-related functions for real-world navigation on the roads in the real-world geographic locale, the navigation-related attribute data including;
  (i) geographic coordinates,
  (ii) a street name,
  (iii) an address range,
  (iv) a turn restriction, and
  (v) road shape; and
 using the application programming interface to provide, by the computer processor, the geographic data from the map database in a suitable format to the game engine program
 wherein individual road segment records are accessed from the map database during the game play of the computer game to provide real time geographic data for display in the game play scenario.

16. The method of claim 15 further comprising:
 converting the geographic data from the map database to a perspective view for display by the computer platform as part of the game play scenario of the computer game.

17. The method of claim 15 further comprising:
 determining a curve through data points used in the map database to represent linearly extending features, wherein the curve is used for display of at least one of the linearly extending features by the computer platform as part of the game play scenario of the computer game.

18. The method of claim 15 further comprising:
 combining road model data with data that represent roads from the map database to provide a realistic visual appearance of road-related things by the computer platform as part of the game play scenario of the computer game.

19. The method of claim 18 wherein the road-related things include at least one selected from a group consisting of: road colors, road pavement, lane stripes, curbs, sidewalks, signs, lampposts, lane dividers, traffic signals, speed bumps, and crosswalks.

20. The method of claim 15 further comprising:
 combining 3D model data with data that represent roads from the map database to provide a realistic visual representation of polygon shaped features in the geographic locale by the computer platform as part of the game play scenario of the computer game.

21. The method of claim 15 further comprising:
 combining 3D model data with data that represent roads from the map database to provide a realistic visual representation of cityscape and landscape features in the geographic locale by the computer platform as part of the game play scenario of the computer game.

22. The method of claim 15 further comprising:
 combining 3D model data with data that represent roads from the map database to provide a realistic visual representation of one of a group consisting of: buildings, fences, trees, shrubbery, lawns, fences, and clouds in the geographic locale by the computer platform as part of the game play scenario of the computer game.

23. The method of claim 15 wherein the application programming interface program provides for spatial queries of data from the map database.

24. The method of claim 15 further comprising:
 using the game engine program to access a game application shell that includes basic logic, rules, strategy, and characters for a type of computer game.

25. The method of claim 24 wherein the type of computer game is selected from a group consisting of: a road rally game, a police chase game, a "bot" fighter game, a flight simulator game, a "first-person-shooter " game, and an auto theft game.

26. The method of claim 15 further comprising:
 using the game engine program to perform specific tasks and operate on an as-needed basis during the game play scenario of the computer game.

27. The method of claim 15 wherein the game engine program comprises at least one selected from a group consisting of: audio engines, logic engines, rules engines, animation engines, graphics engines, and user interface engines.

28. The method of claim 15, wherein the application programming interface requests data representing all road segment records within a selected area from the map database as a function of a spatial query, the spatial query defining the selected area.

29. The method of claim 28, wherein the selected area is defined by a longitude and latitude point and a radial distance from the longitude and latitude point.

30. The method of claim 28, wherein the selected area is defined by a rectangular area having specified geographic boundaries.

* * * * *